United States Patent [19]
Moss

[11] Patent Number: 4,669,216
[45] Date of Patent: Jun. 2, 1987

[54] APPARATUS FOR TRAPPING AND DISPOSING OF RODENTS

[76] Inventor: Ted M. Moss, 6100 Westcreek Dr., #228, Fort Worth, Tex. 76133

[21] Appl. No.: 868,195

[22] Filed: May 23, 1986

Related U.S. Application Data

[63] Continuation-in-part of Ser. No. 757,866, Jul. 23, 1985, abandoned.

[51] Int. Cl.⁴ .................. A01M 1/12; A01M 19/00
[52] U.S. Cl. .................................... 43/73; 43/99; 43/144
[58] Field of Search ................ 43/73, 75–79, 43/99, 144

[56] References Cited

U.S. PATENT DOCUMENTS

| 1,120,451 | 12/1914 | Csizmar | 43/74 |
| 1,404,486 | 1/1922 | Shutoff | 43/78 |
| 2,148,813 | 2/1939 | Hosmer | 43/80 |
| 2,149,311 | 3/1939 | Potts | 43/79 |
| 2,183,926 | 12/1939 | Willis | 43/75 |
| 2,247,931 | 7/1941 | Vincent et al. | 43/76 |
| 3,075,316 | 1/1963 | Pimentel | 43/67 |
| 3,243,913 | 4/1966 | Carriero | 43/98 |
| 3,362,100 | 1/1968 | Winkler | 43/78 |
| 3,423,870 | 1/1969 | Kost | 43/69 |
| 4,148,150 | 4/1979 | Harrell | 43/144 |

FOREIGN PATENT DOCUMENTS

| 81000 | 5/1895 | Fed. Rep. of Germany | 43/79 |
| 97945 | 4/1924 | Fed. Rep. of Germany | 43/78 |

Primary Examiner—Nicholas P. Godici
Assistant Examiner—Carmine Cuda
Attorney, Agent, or Firm—James E. Bradley; H. Dennis Kelly

[57] ABSTRACT

A trap for trapping and disposing of rodents, the trap having a bait container and a bait tube for placing bait in a bait location. An electric eye then senses the presence of a rodent. The trap has a harpoon, activated by the electric eye, for killing the rodent. After the rodent is killed, a pair of flat plates flatten the body. An electric coil then incinerates the body, and the apparatus is automatically reset.

14 Claims, 7 Drawing Figures

APPARATUS FOR TRAPPING AND DISPOSING OF RODENTS

BACKGROUND OF THE INVENTION

This is a continuation-in-part of application Ser. No. 06/757,866 filed on July 23, 1985 now abandoned.

1. Field of the Invention

This invention relates in general to animal traps, and in particular to devices for trapping, killing, and disposing of rodents.

2. Description of the Prior Art

Many devices have been designed to trap or to kill animals, such as rodents. Many of these devices have a spring-loaded harpoon, or spike, which kills the animal by spearing it. The trap is usually sprung when the animal indicates its presence by tripping a mechanical trigger mechanism.

Most animal traps have to be set manually. Therefore, after the trap has caught one animal, the device is inoperable until the trap is reset. However, there are some traps, such as the one shown in U.S. Pat. No. 2,183,926 (Willis), in which the device is automatically reset by an electric motor.

However, disposal of the dead bodies remains a problem. In most animal traps, the body of the animal has to be manually removed when the device is reset. Such a task can be difficult, unpleasant, and dangerous. Also, as in the case where the trap must be manually reset, the trap is inoperable until the dead animal has been removed.

SUMMARY OF THE INVENTION

The general object of this invention is to trap, kill, and dispose of rodents. This object is accomplished by an apparatus having a bait container and several bait tubes for placing bait in several bait locations within the apparatus. An electric eye senses the presence of a rodent at a selected one of the bait locations.

When the presence of the rodent is sensed, a harpoon is fired downward through the rodent. A top plate then moves downward toward a bottom plate, to flatten the body of the rodent. Electric heating coils then incinerate the body of the rodent. After the body of the animal has been sufficiently incinerated, the trap is automatically reset, and new bait is placed in the bait locations.

The above, as well as additional objects, features, and advantages of the invention, will become apparent in the following detailed description.

DESCRIPTION OF THE PREFERRED EMBODIMENT

Figure 1:
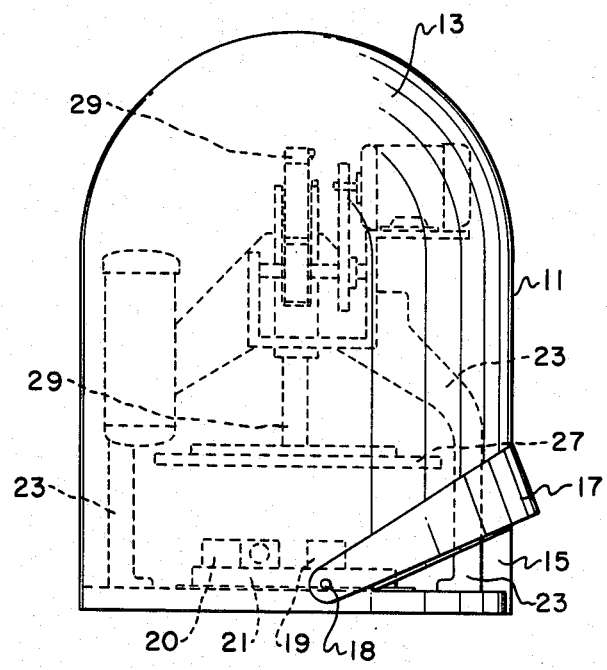
FIG. 1 is a side view of the apparatus of the invention.

The preferred embodiment of the invention has a cylindrical housing 11 with a spherical top 13, as shown in FIG. 1. The housing 11 has a wedge-shaped opening 15, so that a rodent can enter the housing 11.

A door 17 is connected to the housing 11 at two pivot points 18, so that the door 17 can move from an open position, shown in FIG. 1, and a closed position in which the door 17 covers the opening 15. The door 17 is opened and closed by a small motor 19, attached to a shaft through one of the pivot points 18. This small motor 19, and all of the other components of the invention are controlled by a microprocessor control 20.

A circular, flat, bottom plate 21 is mounted on the floor of the housing 11. The bottom plate 21 can be heated by a heating element 22 (FIG. 2), enclosed within the bottom plate 21.

Three support legs 23 curve upward from the floor of the housing 11. The support legs 23 meet above the bottom plate 21 at a cylindrical guide sleeve 25.

Figure 2:
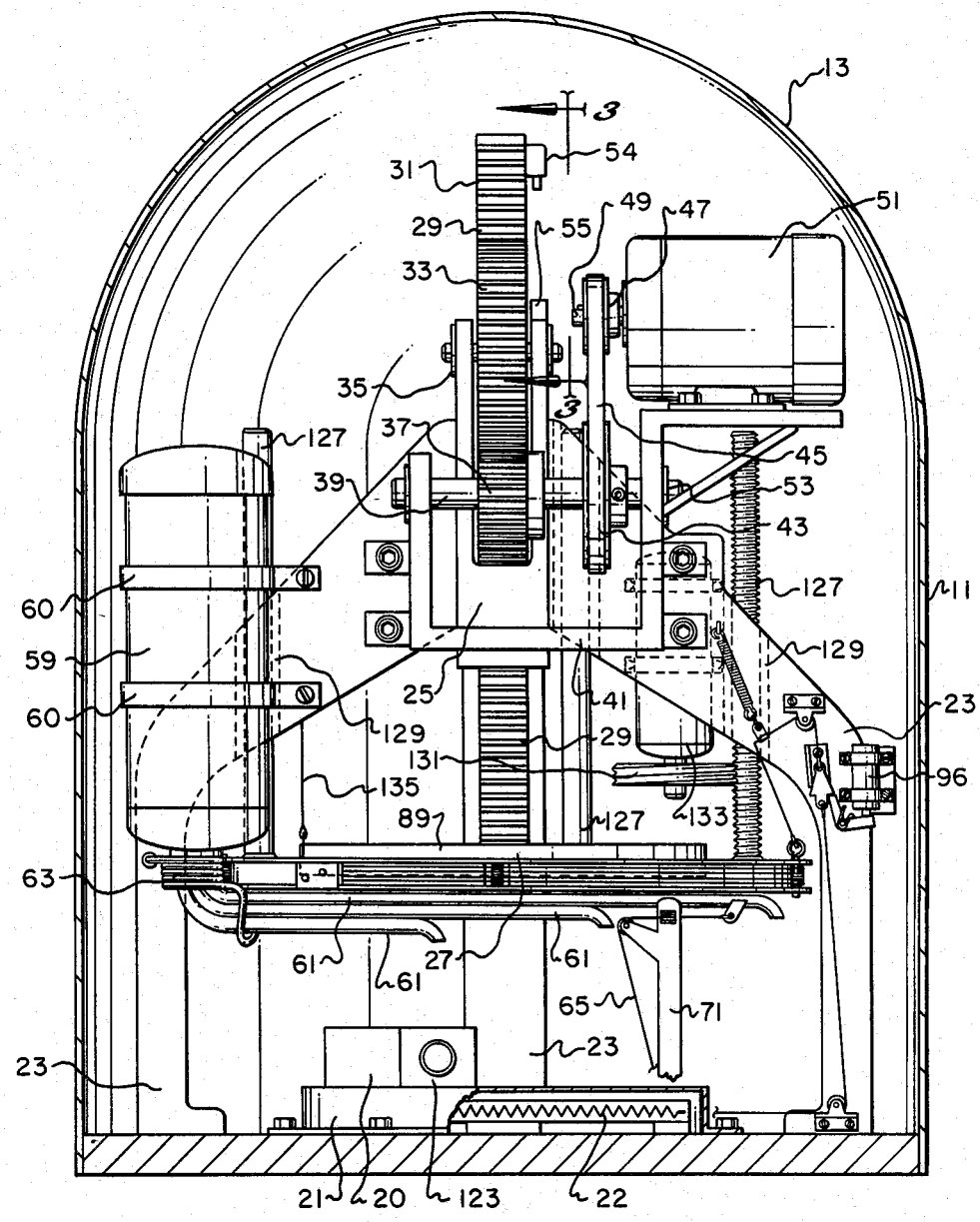
FIG. 2 is a sectional front view of the apparatus of the invention.

As shown in FIG. 2, a circular, flat, top plate 27 is suspended from a top plate shaft 29 so that the top plate 27 is directly above the bottom plate 21. The top plate shaft 29 extends upward through the guide sleeve 25, and has gear teeth 31 on one side. The gear teeth 31 on the shaft 29 engage a large gear 33. The large gear 33 rotates about a large shaft 35, which is connected to the guide sleeve 25.

The large gear 33 also engages the teeth of a second, smaller gear 37. The smaller gear 37 is integral with a small gear shaft 39, which is mounted on a mounting bracket 41. The mounting bracket 41 is bolted onto two of the support legs 23.

The small gear shaft 39 also supports a pulley 43. The pulley 43 is connected by a belt 45 to a motor pulley 47 on the drive shaft 49 of an electric motor 51. A locking clip 53 can be removed from the small gear shaft 39, so that the small gear shaft 39 can be removed from the mounting bracket 41 and the belt 45 can be replaced.

Figure 3:
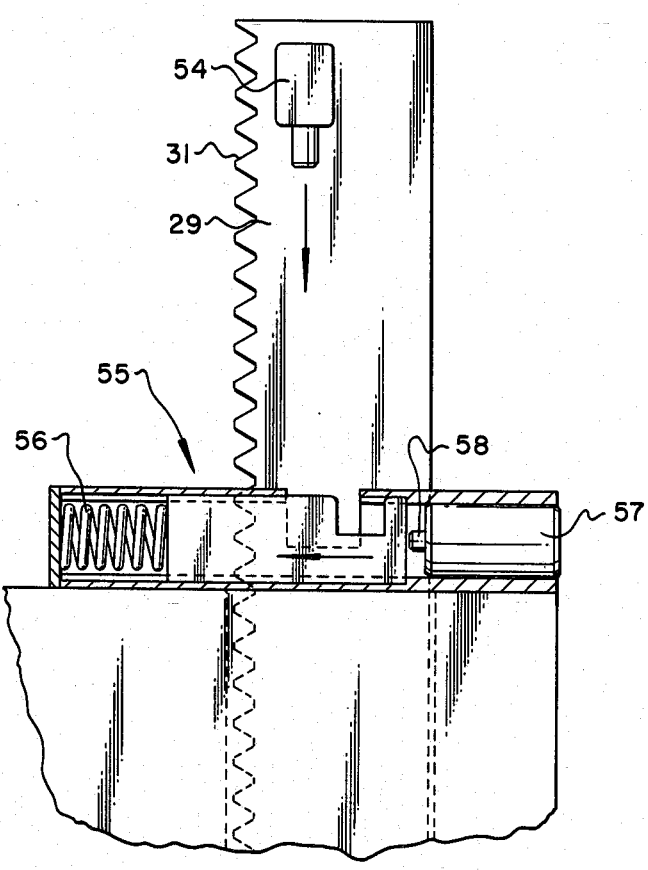
FIG. 3 is a sectional view along lines 3—3 in FIG. 2.

FIG. 3 shows a solenoid contact switch 54 mounted on the top plate shaft 29. As the top plate shaft 29 moves downward, the contact switch 54 approaches a stop 55, mounted on the guide sleeve 25. The stop 55 is a two position switch, which a tension spring 56 normally keeps in the right-hand position. In this position, the stop 55 will make contact with the contact switch 54 when the top plate 27 is 3/16 inch above the bottom plate 21. When the contact switch 54 touches the stop 55, the motor 51 is shut off, so that the top plate 27 is not lowered any closer to the bottom plate 21.

After the initial contact between the contact switch 54 and the stop 55, a solenoid 57 and plunger 58 push the stop to the left-hand position. On subsequent lowerings of the top plate 27, the stop 55 will allow the top plate 27 to lower all the way down to the bottom plate 21 before the motor 51 is shut off. When the trap is reset, the stop 55 is reset to the right-hand position.

A bait container 59 is attached to one of the support legs 23 by a pair of mounting bands 60. Three bait tubes 61 extend from the bottom of the bait container 59. The bait tubes 61 are of three different lengths, so that bait can be placed in three different places on the bottom plate 21. The bait tubes 61 are movable between a baiting position, over the bottom plate 21, and a stored position, off to one side. A spring 63 biases the bait tubes 61 toward the baiting position.

Figure 7:
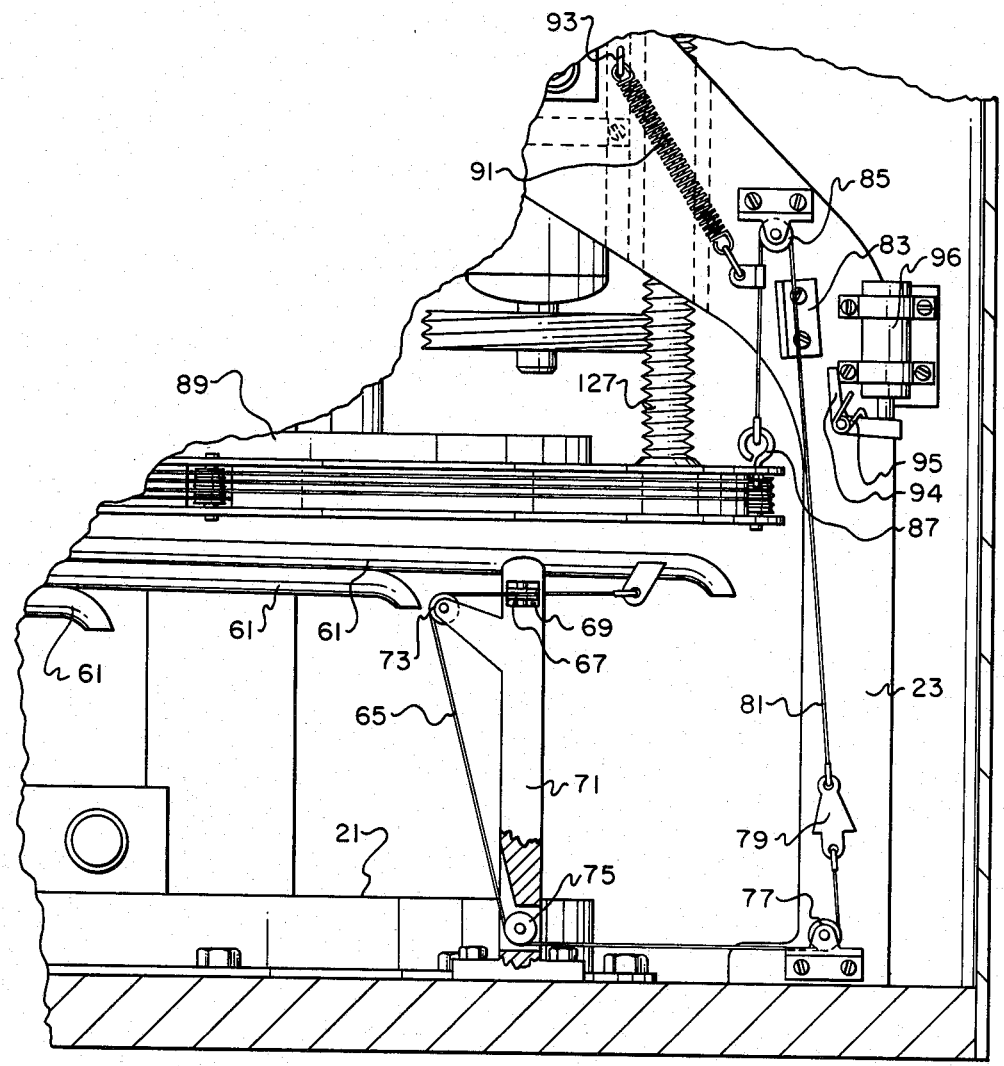
FIG. 7 is a close up side view of the apparatus of the invention.

The bait tubes 61 are secured in the stored position, shown in FIG. 2, by a locking means, which is more clearly shown in FIG. 7. In FIG. 7, the bait tubes 61 are shown in the baiting position. A cable 65 is attached to the bait tubes 61. The cable 65 extends to a horizontal pulley 67, which is mounted in a hole 69 near the top of a pulley post 71. The cable 65 then extends over an upper vertical pulley 73 and down to a lower vertical pulley 75. The upper and lower vertical pulleys 73, 75 are also mounted on the pulley post 71.

The cable 65 then extends to a vertical pulley 77 mounted on one of the support legs 23. The cable 65 is then attached to a cable lock cone 79. A second cable 81 extends upward from the cable lock cone 79, past a cable locking shield 83, to a second vertical pulley 85 on the support leg 23. The cable 81 goes over the vertical pulley 85, and then down to an eye bolt 87, mounted on a heating element housing 89. A cable retract spring 91 is attached between the second cable 81 and an eye bolt 93 mounted on the support leg 23.

A locking lever 94 is mounted on the support leg 23. A locking lever spring 95 biases the locking lever 94, so that the locking lever 94 will lock under the cable lock cone 79 when the bait tubes 61 are in the stored position. A solenoid 96 is mounted on the support leg 23 to rotate the locking lever 94 away from the cable lock cone 79.

When the heating element housing 89 is in the upper position, and the cable lock cone 79 is locked on the locking lever 94, the cable retract spring 91 takes the slack out of the cable 81. To move the bait tubes to the baiting position, the solenoid 96 is activated to rotate the locking lever 94. The locking lever 94 releases the cable lock cone 79, allowing the spring 63 to rotate the bait tubes 61 to the baiting position, shown in FIG. 7.

The bait tubes 61 are returned to the stored position by the downward movement of the heating element housing 89, which will be described later. As the heating element housing 89 moves downward, the cables 65, 81 pull the bait tubes 61 toward the pulley post 71. When the cable lock cone 79 passes the locking lever 94, the locking lever 94 snaps below the cable lock cone 79. The bait tubes are thus locked in the stored position, until the solenoid 96 is activated to rotate the locking lever 94.

Figure 4:
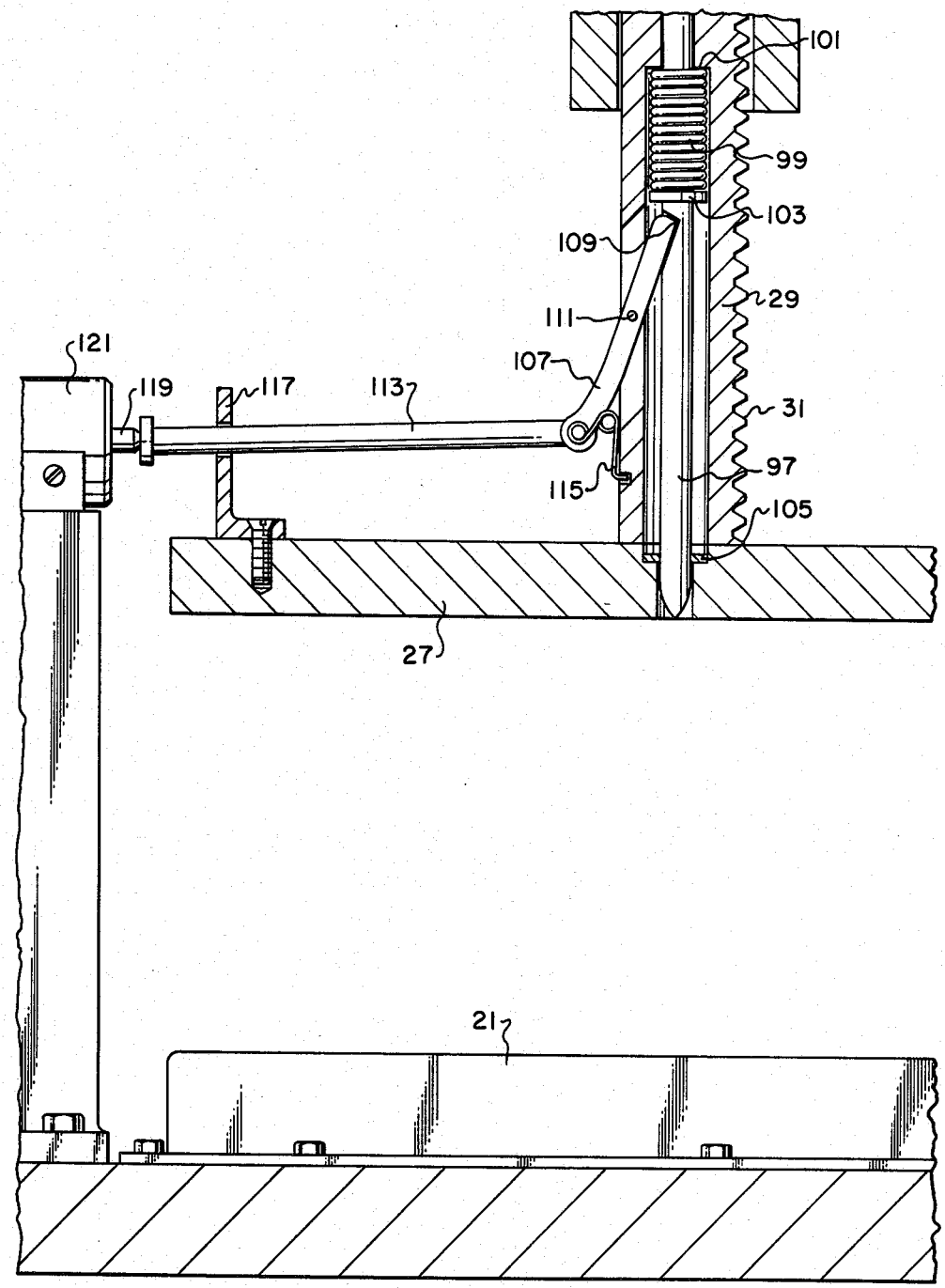
FIG. 4 is a sectional side view of the invention.

FIG. 4 illustrates the harpoon firing mechanism. The top plate 27 and the top plate shaft 29 are shown in their uppermost position, above the bottom plate 21. A harpoon 97 is located within the hollow top plate shaft 29, when the harpoon 97 is cocked. A heavy spring 99 is compressed between the upper end of the harpoon 97 and an annular shoulder 101 in the top plate shaft 29. When the harpoon firing mechanism is triggered by a rodent, the heavy spring 99 fires the harpoon 97 downward at great velocity. The harpoon 97 moves downward through the rodent. If the rodent's body is too small to stop the harpoon 97, a shoulder 103 on the upper end of the harpoon strikes a brass washer 105 in the top plate 27. The shoulder 103 and the washer 105 limit the downward movement of the harpoon 97, and prevent the point of the harpoon 97 from striking the surface of the bottom plate 21.

The harpoon 97 is held in its cocked position by a harpoon locking lever 107, which locks in a locking lever slot 109 in the side of the harpoon 97. The harpoon locking lever 107 is pivotally connected, at a pivot point 111, to the top plate shaft 29. The lower end of the locking lever 107 is pivotally connected to a harpoon release arm 113. A locking lever spring 115 biases the locking lever 107 toward the locked position.

The harpoon release arm 113 extends through a release arm guide 117, which is mounted on the top of the top plate 27. The end of the release arm 113 contacts a plunger 119, which is activated by a solenoid 121. The solenoid 121 is activated by an electric eye 123, shown in FIG. 2.

The electric eye 123 is a sensing means for sensing the presence of a rodent. The electric eye 123 is aimed to detect the presence of a rodent in the middle of the bottom plate 21. When the electric eye 123 senses the presence of a rodent, the solenoid 121 is triggered. The solenoid 121 pushes the plunger 119 against the release arm 113. The release arm 113 rotates the locking lever 107 about pivot point 111, pulling the top of the locking lever 107 out of the locking lever slot 109. The harpoon 97 is released, and the spring 99 fires the harpoon 97 downward at great velocity, into the rodent. The harpoon 97 is the killing means for killing the rodent.

Figure 5:
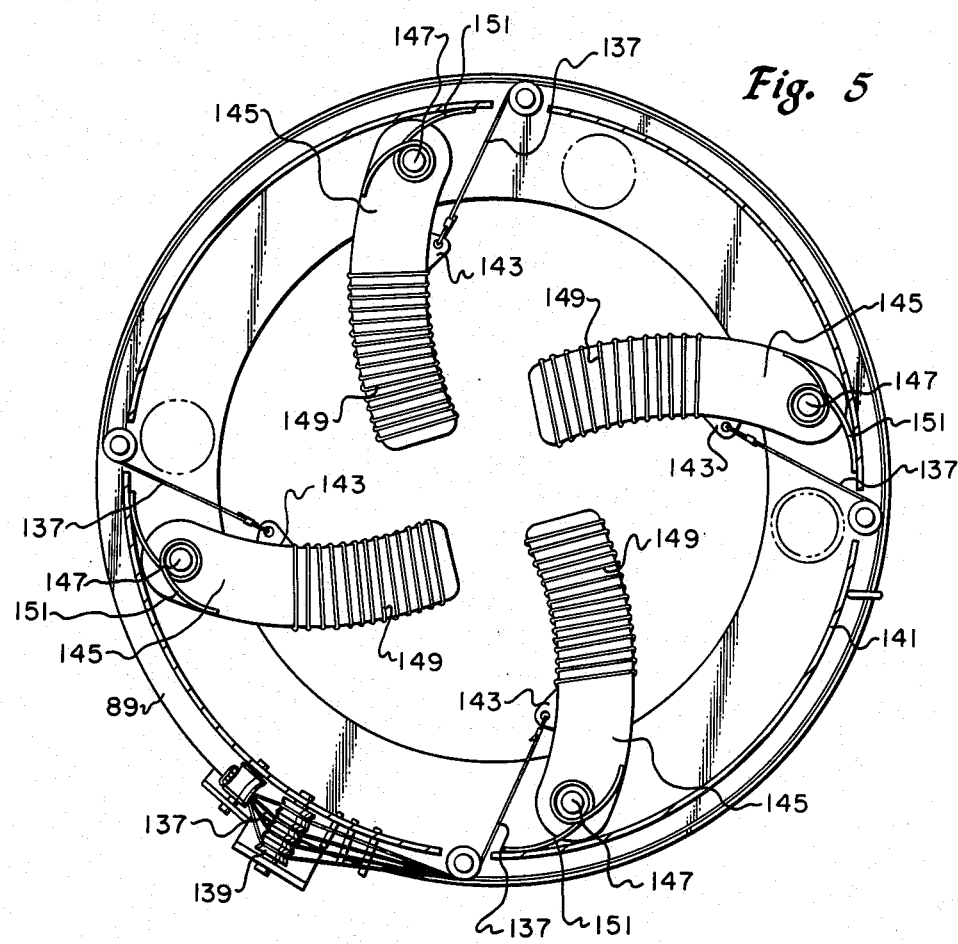
FIG. 5 is a top view of the incinerating means of the invention.
Figure 6:
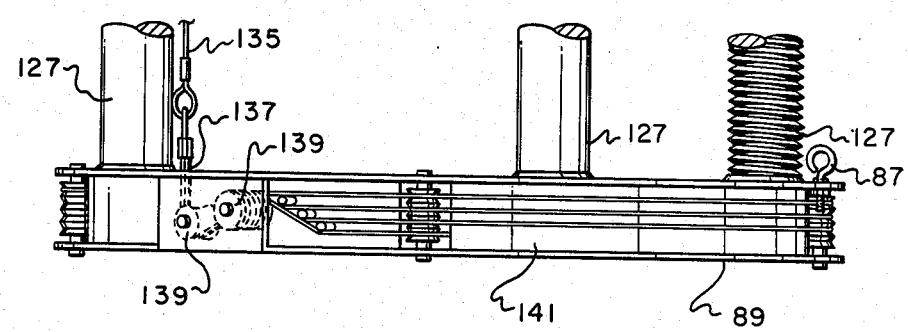
FIG. 6 is a side view of the incinerating means of the invention.

FIGS. 5 and 6 illustrate part of the incinerating means for incinerating the body of the rodent. A heating element housing 89 is suspended from three shafts 127. The shafts 127 extend upward through shaft guides 129, mounted on the support legs 23, as shown in FIG. 2. One of the shafts 127 is threaded, and the threads are in threaded contact with a drive gear 131. The drive gear 131 is rotated by a small motor 133, which is mounted on one of the support legs 23. The heating element housing 89 can thus be moved vertically by the small motor 133.

A single cable 135 extends downward from one of the support legs 23 to the heating element housing 89. The single cable 135 is connected to a set of four cables 137. The four cables 137 thread around a plurality of rollers 139, and then extend through the heating element housing 89 around a cable enclosure wall 141. Each of the cables 137 passes through a separate hole in the cable enclosure wall 141, and is connected to an eyelet 143 on a heat-resistant, china, heating element 145.

Each heating element 145 is pivotally attached to the heating element housing 89 at a pivot point 147, and is surrounded by a coil of 3/32" heating wire 149. A spring 151 biases each heating element 145 toward a retracted position against the cable enclosure wall 141. As the heating element housing 89 is lowered, the cable 135 pulls upward on the set of cables 137. The cables 137 pull on the eyelets 143, and rotae the heat elements 145 to a central position, as shown in FIG. 4.

The apparatus of the invention will now be explained in detail. When the apparatus is first activated, the bait tubes 61 are in the stored position, as shown in FIG. 2. The solenoid 96 is activated to rotate the locking lever 94. When the locking lever 94 rotates, the cable lock cone 79 is released, allowing the spring 63 to rotate the bait tubes 61 to the baiting position, shown in FIG. 7. Bait is then dispensed from the bait container 59 through the bait tubes 61 into three positions on the bottom plate 21.

The heating element housing 89 is then lowered by the small motor 133. The heating element housing 89 pulls the cables 65, 81, and the cables 65, 81 pull the bait tubes 61 toward the pulley post 71. When the cable lock cone 79 passes the locking lever 94, the locking lever 94 snaps below the cable lock cone 79. The bait tubes 61 are thus locked in the stored position. The small motor 133 then raises the heating element housing 89, and the apparatus is set.

A rodent then enters the opening 15 to eat the bait on the bottom plate 21. When the rodent reaches the third piece of bait, which is in the center of the bottom plate 21, the electric eye 123 senses the rodent's presence. The electric eye 123 signals the solenoid 121 and plunger 119 to push the release arm 113. The release arm 113 rotates the locking lever 107, releasing the harpoon 97. The heavy coil spring 99 fires the harpoon 97 downward into the rodent.

The motor 51 then rotates the various gears to lower the top plate 27. The top plate 27 moves downward toward the bottom plate 21, smashing the rodent between the two flat surfaces to a thickness of 3/16". The motor 51 then reverses, and returns the top plate 27 to its uppermost position.

The small motor 133 then lowers the heating element housing 89. As the heating element housing 89 lowers, the heating elements 145 are swung inward to their active position, and the heating coils 149 are heated. The heating elements 145 and the heating element 22 in the bottom plate 21 then incinerate the flattened body of the rodent.

After a selected time, the small motor 133 reverses, and returns the heating element housing 89 to its uppermost position. The motor 51 then restarts, and moves the top plate 27 downward again. If the top plate 27 cannot reach the bottom plate 21, because of the body of the rodent, the smashing and incinerating operations will be repeated.

If the top plate 27 can reach the bottom plate 21, the locking lever 107 relocks within the locking lever slot 109 of the harpoon 97. Then, when the top plate 27 is raised, the harpoon 97 is also raised.

The solenoid 69 once again releases the bait tube locking gate 65. The bait tubes 61 swing out to the baiting position, and new bait is deposited on the bottom plate 21.

The apparatus has several advantages over the prior art. The apparatus can trap, kill, and dispose of a large number of rodents, without having to be reset manually. The flattening and incinerating of the rodent body solves the serious problem of disposing of the dead bodies.

While the invention has been shown in only one of its forms, it should be apparent to those skilled in the art that it is not so limited, but is susceptible to various changes and modifications without departing from the spirit thereof.

I claim:

1. An apparatus for trapping and disposing of rodents, the apparatus comprising:

sensing means for sensing the presence of a rodent;
   killing means for killing the rodent; and
   incinerating means for incinerating the rodent.

2. An apparatus, as recited in claim 1, further comprising power means for automatically resetting the apparatus after the rodent is incinerated.

3. An apparatus, as recited in claim 1, further comprising flattening means for flattening the rodent before the rodent is incinerated.

4. An apparatus, as recited in claim 3, further comprising power means for automatically resetting the apparatus after the rodent is incinerated.

5. An apparatus for trapping and disposing of rodents, the apparatus comprising:

an electric eye means for sensing the presence of a rodent;
   a harpoon means, activated by the electric eye means, for killing the rodent; and
   an electric heating coil means, for incinerating the rodent.

6. An apparatus, as recited in claim 5, further comprising power means for automatically resetting the apparatus after the rodent is incinerated.

7. An apparatus, as recited in claim 5, further comprising a pair of flat plates for flattening the rodent.

8. An apparatus, as recited in claim 7, further comprising power means for automatically resetting the apparatus after the rodent is incinerated.

9. An apparatus, as recited in claim 7, wherein the flat plates are a bottom plate and a vertically movable top plate, and wherein the harpoon means fires downward through a hole in the top plate.

10. An apparatus, as recited in claim 9, further comprising power means for automatically resetting the apparatus after the rodent is incinerated.

11. An apparatus, as recited in claim 9, further comprising baiting means for placing bait in a bait location in the apparatus.

12. An apparatus, as recited in claim 11, further comprising power means for automatically resetting the apparatus after the rodent is incinerated.

13. An apparatus, as recited in claim 11, wherein the baiting means is a bait container and a bait tube.

14. An apparatus, as recited in claim 13, further comprising power means for automatically resetting the apparatus after the rodent is incinerated.

* * * * *